Figure 1:
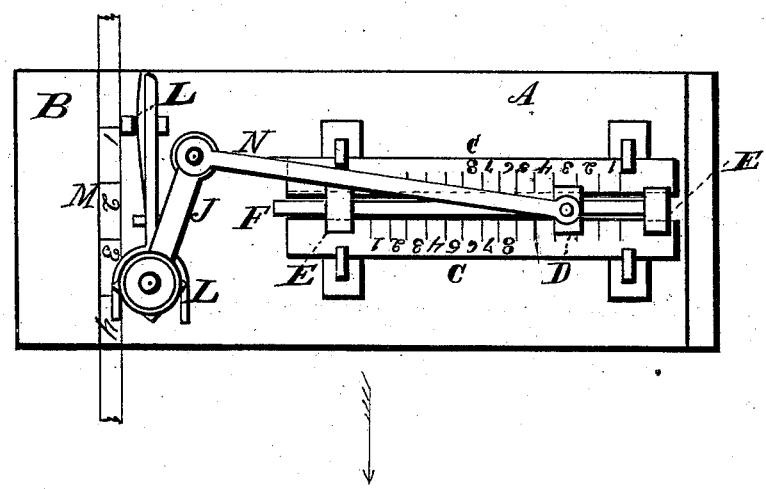
Figure 1:
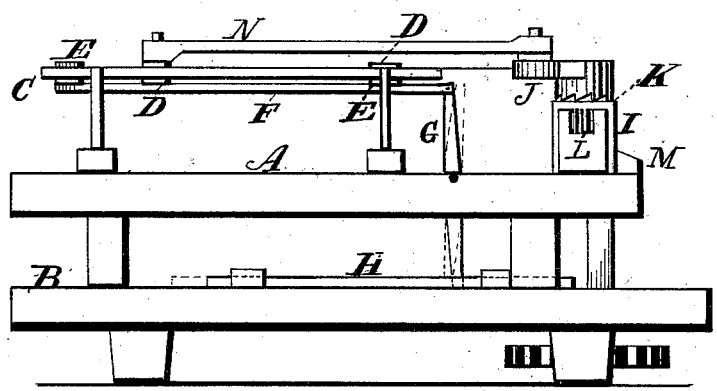

J. L. WRIGHT.
Corn-Droppers for Planters.

No. 199,485.  Patented Jan. 22, 1878.

FIG. II.

WITNESSES,
Milton Swift
Charles H. Philips

INVENTOR,
James L. Wright
By G. L. Chapin
Atty.

UNITED STATES PATENT OFFICE.

JAMES L. WRIGHT, OF WILMOT, WISCONSIN.

IMPROVEMENT IN CORN-DROPPERS FOR PLANTERS.

Specification forming part of Letters Patent No. 199,485, dated January 22, 1878; application filed July 13, 1877.

*To all whom it may concern:*

Be it known that I, J. L. WRIGHT, of Wilmot, in the county of Kenosha and State of Wisconsin, have invented a new and useful Improvement in Corn-Droppers for Planters, of which the following is a specification:

The present invention relates to a device to be attached to an ordinary corn-planter or other like implement for correctly check-rowing corn or other seed which is to be planted in hills a suitable distance apart, for cultivating by cross-furrows; and its nature consists, mainly, in a reciprocating cross-head which runs in ways provided with scales, and drives a carriage which puts the dropper-slide in motion, said cross-head being driven by a pitman and clutch-crank, which are put in motion by a shaft communicating with a chain-gear, which is to be driven by the running-gear of the planter in the ordinary manner of driving, the corn dropping by a like wheel on the hub of one of the traveling wheels.

On the end of the frame of the planter is attached an indicator or scale, by means of which and the ways with the cross-head and scale the device can be adjusted so as correctly to check-row, no matter what the position of the parts may be when the planter is at the beginning of a row and ready to return.

In the drawings, Figure I is a top view of the frame of an ordinary corn-planter, attached to which are my improvements. Fig. II is a rear view of Fig. I, being an elevation.

A B represent the two-part frame of an ordinary planter. I represents a shaft, which, by means of suitable gear-wheels, receives motion from the traveling wheels of a planter in the ordinary well-known manner.

The upper end of this shaft is provided with a half part of a clutch, engaging another half part of a clutch on the under side of a crank, J, which is journaled to the top of the shaft I; and the shaft may turn independent of the crank, or the shaft may drive the crank according to the position of a clutch-lever, L, which engages the part K of the clutch which slides on the shaft I, and puts it in gear with the crank J, or puts it out of gear with it, as and for the purpose hereinafter described.

To the end of this crank J is journaled a pitman or connecting rod, N, whose function is to drive the cross-head D, which runs in ways C C, supported some little distance from the top frame-piece A of the planter.

A carriage consisting of slides E and a connecting-rod, F, also has a reciprocating movement on the guides C, which is given by the cross-head D. A connecting-rod, G, is pivoted to the end of connecting-rod F, and its middle part is journaled to the upper frame-piece A, and its lower end projects into a mortise or slot in the cut-off slide H, so that when the shaft I is rotated, the said cut-off H will have a reciprocating movement, and put any ordinary dropping device in motion to which it may be connected.

In practice the cross-head D may move sixteen inches when rows are to be dropped four feet apart, while the traveling wheels of the planter move four feet, and, if the rows are to be a greater or less distance apart, the traveling wheel should move—as, for instance, three feet while the cross-head moves one foot. This proportion should be maintained. When the cross-head D moves sixteen inches, the traveling-wheel should have turned four feet, in the present construction.

The guides C have marked thereon scales, commencing at opposite ends, of sixteen divisions, corresponding in number to one-third the number of inches the traveling wheel moves from hill to hill to be planted. The scale M, which may be termed a "pointer," is placed on the machine, pointing in the direction the row is to be planted, and is of any desired length, and it is divided in spaces three times the distance of the spaces on the guides C, so that the dropping device or cut-off may be set at the commencement of a row to check with a previous row, as follows:

When the planter is faced about, and it is found, on observation, that the proper check comes opposite 3 on the pointer-scale, and the dropping device is not in position to drop, raise the lever L and unclutch the lever J, and turn the latter till the cross-head D comes to 3 on one of the guides C. This will drop the first hill; then depress the lever L to connect the clutch, and proceed with the planting.

If, in passing over obstacles, the checking should not come properly, disconnect the clutch and set the cross-head D on a figure on scale C, to the same figure on the pointer, which figure on the latter should be opposite the proper checking-place.

In manufacturing the device iron will be found the best material for making the operating parts.

Having thus described my device, what I claim as new, and desire to secure by Letters Patent, is—

The combination of the scale C C, pointer-scale M, carriage E F, cross-head D, lever L, connecting-rod N, crank J, clutch K on shaft I, as and for the purpose set forth.

JAMES L. WRIGHT.

Witnesses:
  G. W. ALFS,
  THEO. C. SCHROEDER.